(12) United States Patent
Stiller

(10) Patent No.: US 6,847,874 B2
(45) Date of Patent: Jan. 25, 2005

(54) METHOD FOR CONTROLLING THE DAMPING FORCE OF AN ADJUSTABLE DAMPER IN A MOTOR VEHICLE

(75) Inventor: Alexander Stiller, Garbsen (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 10/158,922

(22) Filed: Jun. 3, 2002

(65) Prior Publication Data
US 2002/0183907 A1 Dec. 5, 2002

(30) Foreign Application Priority Data
Jun. 1, 2001 (DE) ............................................. 101 26 933

(51) Int. Cl.[7] ........................ B60G 25/00; B60G 17/015
(52) U.S. Cl. ............................ 701/37; 701/38; 280/5.5
(58) Field of Search .................... 701/37, 38; 280/5.515, 280/5.5, 6.159, 5.514, 6.157

(56) References Cited

U.S. PATENT DOCUMENTS

| | | | | |
|---|---|---|---|---|
| 5,303,155 A | * | 4/1994 | Kallenbach et al. | ... 364/424.05 |
| 5,475,596 A | * | 12/1995 | Henry et al. | ................... 701/37 |
| 5,671,142 A | * | 9/1997 | Tatarazako | ........... 364/424.046 |
| 5,701,245 A | * | 12/1997 | Ogawa et al. | ........ 364/424.046 |
| 5,781,873 A | * | 7/1998 | Sasaki | ......................... 701/37 |
| 5,931,879 A | * | 8/1999 | Neumann et al. | ............. 701/37 |
| 5,987,368 A | * | 11/1999 | Kamimae et al. | ............. 701/37 |
| 6,259,982 B1 | * | 7/2001 | Williams et al. | ............. 701/38 |

FOREIGN PATENT DOCUMENTS

| DE | 38 43 137 | 6/1990 |
|---|---|---|
| DE | 196 48 176 | 5/1998 |

* cited by examiner

Primary Examiner—Tan Q. Nguyen
Assistant Examiner—Dalena Tran
(74) Attorney, Agent, or Firm—Walter Ottesen (57) ABSTRACT

A method controls (open loop and/or closed loop) the damping force of adjustable dampers in vehicles, especially in motor vehicles, with active or semi-active damping systems. The method effects economically and rapidly a reliable control (open loop or closed loop). The control (open loop and closed loop) takes place in dependence upon the damper velocity ($V_{DK}$) and the damper velocity signals are determined with the aid of distance sensors and difference formation of the distance sensor signals over a predetermined time difference.

16 Claims, 4 Drawing Sheets

METHOD FOR CONTROLLING THE DAMPING FORCE OF AN ADJUSTABLE DAMPER IN A MOTOR VEHICLE

FIELD OF THE INVENTION

The invention relates to a method for controlling (open loop and/or closed loop) the damping force of adjustable dampers in a motor vehicle. The invention is especially advantageously used in motor vehicles having a level control or air suspension.

BACKGROUND OF THE INVENTION

Present-day damping systems in motor vehicles can be subdivided into three groups, namely: passive, semi-active and active damping systems. In all of these damping systems, the magnitude of the damping is dependent upon the relative velocity of the damper. In passive damping systems, the magnitude and the direction of the force, which is applied by the damper, is only dependent upon the relative velocity of the damper. In passive damping systems, a change of the damping force during travel is not provided.

In semi-active damping systems, the damping force can be changed by a change of the fluid or gaseous flow utilizing a valve. In this way, different control programs can adjust the optimal damping force by means of an actuator element in dependence upon the current driving situation. In active damping systems, the desired force in any direction is made available by an actuator independently of the relative velocity of the damper.

A level control system with a control of the vibration dampers of the chassis is known from U.S. Pat. No. 6,164,665. In this system, an actuating signal is used for the control which corresponds to the damping requirement for the movement of the vehicle bodywork. A so-called poor-roadway characteristic value is added to this damping requirement in order to improve the driving safety and comfort. The change of the vibration damping adjustment is determined by the time-dependent trace of the acceleration of the actual spacings of the wheel to the vehicle bodywork. The acceleration is computed by a two-time differentiation of the measured spring displacement.

Furthermore, it is conventional to mount wheel acceleration sensors at respective wheels for determining the relative damping velocity and to undertake the damping control based on the acceleration signals. This method requires a high complexity with respect to the sensors.

SUMMARY OF THE INVENTION

It is an object of the invention to provide a method wherein the control of the damping force is improved.

The method of the invention is for controlling (open loop or closed loop) the damping force of an adjustable damper in a motor vehicle having an active or semi-active damping system. The method includes the steps of: determining damping velocity signals ($V_{dl}$, $V_{ds}$) over a fixed time difference utilizing distance sensors and a difference formation of the distance sensor signals ($h_z$); and, controlling (open loop or closed loop) the damping force in dependence upon the damping velocity ($V_{DK}$).

Possibly already available distance sensors of a level control or air suspension can be utilized based on the following: the control (open loop and/or closed loop) in dependence upon the damper velocity and the determination of the damper velocity signals by means of distance sensors and the difference formation of the signals, which are generated by the sensors, over a predetermined time difference. Furthermore, cost-effective distance sensors can be used in lieu of expensive acceleration sensors. Distance sensors for measuring velocity do not have to be calibrated; in contrast, an offset compensation must take place with respect to acceleration sensors. In addition, acceleration sensors supply imprecise signals when there are longitudinal and transverse accelerations present.

For an optimal adjustment of the bodywork or damping force, the damping velocity for each component to be damped is individually determined, especially for each wheel or for each wheel suspension of a vehicle. In this way, a high measure of comfort and safety, especially driving safety, is ensured because each component or wheel is optimally damped.

In order to have the least amount of computation, the distance sensor measures the distance between a wheel and the bodywork so that the relative damping velocity can be determined very simply from two distance signals and the time between the two signals. Here, it is a precondition that the signals are digitalized in order to carry out a corresponding control (closed loop or open loop).

Another feature of the invention provides that not only a damping velocity signal is determined via the difference formation of the distance signal over a time interval, but that a second damping velocity signal is determined in this way, however, over a second time interval which is greater than the time interval of the first damping velocity signal. Various accuracies are achieved because of the different lengths of the time intervals for the computation of the particular damping velocity signal. The damping velocity, which was obtained over a longer time interval, has a higher accuracy. However, the second damping velocity signal, which is determined over a longer time interval, is slower and correspondingly less suitable for a rapid intervention. The first damping velocity signal, which is determined over a short time interval, is less precise but, because of the short clock cycle, a response to changes or acting external forces can take place rapidly via a corresponding change of the damping force. A selection is then made based on fixed parameters or characteristic variables as to whether the precise or the rapid damping velocity signal is to form the basis of the further control (closed loop or open loop) of the damping force.

A practical embodiment provides that the first damping velocity signal is formed over a time interval of 0.5 msec to 5 msec and the damping velocity signal is formed over a time interval of 5 msec to 50 msec.

A simple and effective selection of the damping velocity signal takes place via fixing a threshold value of the magnitude of the first damping velocity signal. If the magnitude of the first damping velocity signal exceeds a threshold value, this means that a rapid reaction is required because of the high vertical velocity of the wheel. In this case, the control (closed loop or open loop) damping force is based on the first damping velocity signal, that is, the rapid and imprecise damping velocity signal. Otherwise, a rapid control (closed loop or open loop) is unnecessary so that the more precise damping velocity signal, which was determined over a longer time interval, can be used.

A filtering of the distance signal through first and second lowpass filters is provided in order to keep the complexity of control as low as possible and especially to prevent unnecessary displacement movements of the valve for controlling the through-flow quantity in the damper. The two lowpass filters have different time constants and correspondingly generate different output signals which are the basis of further computations for the damping velocity signals. In addition, these filters have the function of an anti-aliasing filter for the formation of the velocity signals with different scanning times. The first lowpass filter includes a time constant of 0.25 msec to 2.5 msec and the second lowpass filter has a second time constant in the range of 2.5 msec to 25 msec. These time constants correspond to half of the respective time intervals for the determination of the damping velocity signals.

An alternative to the selection as to which damping velocity signal is to form the basis of the control (open loop or closed loop) of the damping force is based on the fact that two output signals are filtered out of the distance signal by two lowpass filters having different time constants. The magnitude of the difference signal between the first and second output signals is used as a parameter which forms a basis on which a selection of the damping velocity signal is made. If the magnitude of the difference signal exceeds a fixed value, then the first damping velocity signal (that is, the rapid and imprecise signal) forms the basis of the further processing; otherwise, when there is a drop below the threshold value, the second damper velocity signal having a greater resolution is used. The time constants likewise are 0.25 msec to 2.5 msec for the first lowpass filter and 2.5 msec to 25 msec for the second lowpass filter.

One embodiment of the invention provides that the damper force is controlled in accordance with the skyhook method, the ground-hook method or a combination of these methods. Depending upon the required precision, it is provided that either a continuous control method is used which can quasi continuously select between a strong and a low damping force or that a so-called on/off-skyhook control is undertaken wherein there is a switchover between a low and a high damping.

The damper velocity, which is needed in the skyhook or the ground-hook method for computing the inverse damper characteristic field can be computed from the determined damping velocity signals and furthermore, the required bodywork velocity for the computation of the relative damper velocity can be determined utilizing an acceleration sensor mounted on the bodywork. Alternatively, it is provided that the bodywork velocity is determined from a damper velocity signal having an out-filtered wheel velocity component. Here, the more precise damping velocity signal is used and the corresponding wheel velocity component is filtered out. The determination of the precise damping velocity signal takes place in accordance with the above-described method.

In order not to overburden the actuators because of their mechanical inertia, in a further embodiment of the invention, a highpass filter is provided for the analysis of the distance signal wherein vibrations with low frequencies of the wheel are filtered out and the high frequency vibrations are passed through. When the limit value of the output signal is exceeded, there is a switchover to a fixed, highly-filtered damper velocity signal which is advantageously determined over a long time interval for achieving a most precise adjustment of the damping force. In this way, it is ensured that high frequency disturbances because of which the damper can be switched over from hard to soft or vice versa can be detected. With the switchover to the highly damped signal, the actuators are not mechanically overburdened and the switching noises because of the frequent switchovers are reduced.

BRIEF DESCRIPTION OF THE DRAWINGS

The invention will now be described with reference to the drawings wherein.

DESCRIPTION OF THE PREFERRED EMBODIMENTS OF THE INVENTION

Figure 4A:
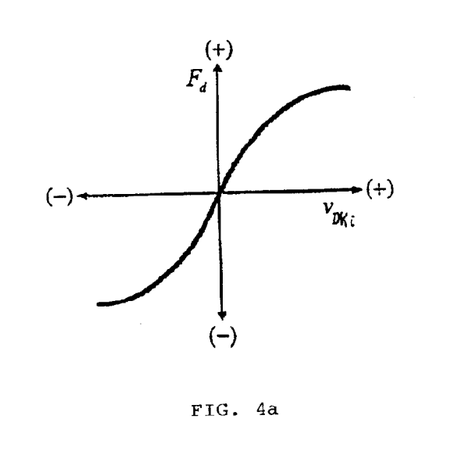
FIG. 4a is a damper characteristic line of a passive damper system.

FIG. 4a shows a damper characteristic line of a passive damper system in dependence upon the variables of damper force $F_d$ and damper velocity $V_{DK}$. The damper velocity $V_{DK}$ is hereinafter understood to be the relative damping velocity, that is, the velocity which the damper exhibits when the component, which is to be damped, moves relative to the corresponding component. In a vehicle, this would be the movement of the wheel relative to the bodywork. The damper characteristic line according to FIG. 4a shows an almost linear trace for low damper velocities $V_{DK}$ with this characteristic line approaching a limit value for high damper velocities $V_{DK}$. A shift or wanted change of the damper characteristic line is not provided for passive damping systems.

Figure 4B:
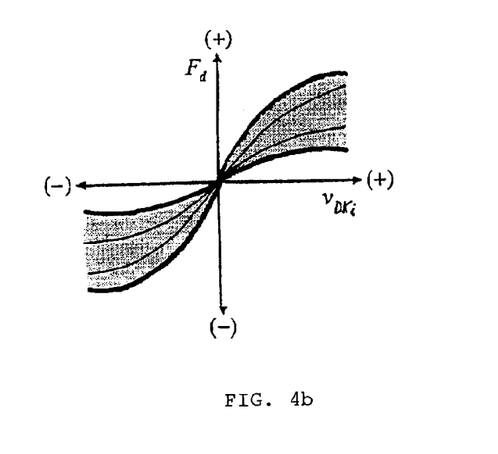
FIG. 4b is a damper characteristic field of a semi-active damper system.

FIG. 4b shows a damper characteristic field of a semi-active damper system wherein a plurality of values for the damper force can be adjusted between two limit values in dependence upon the damper velocity $V_{DK}$. In a discrete control system, there can be a switchover between the maximum and minimum values and, in contrast, for a continuous control system, the possibility exists to select any desired value between the limit values and to thereby optimally adapt the damping force to the particular load.

Figure 3:
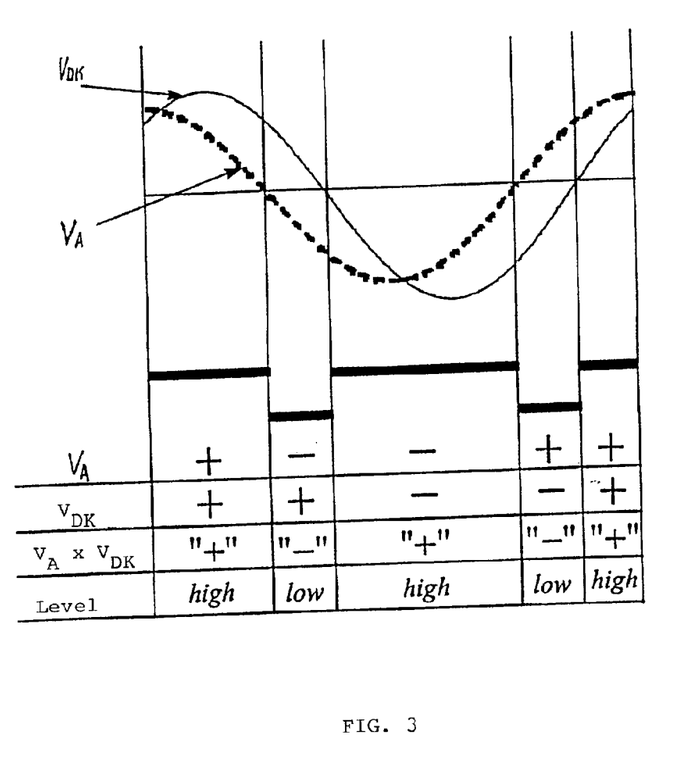
FIG. 3 is a schematic showing the skyhook control.

An example of such a discrete control system is shown in FIG. 3 wherein the product is formed from the damper velocity $V_{DK}$ and the bodywork velocity $V_A$. The bodywork velocity $V_A$ here does not identify the vehicle speed by the vertical velocity of the vehicle bodywork. The skyhook control method is explained based on FIG. 3.

When the relative damper velocity $V_{DK}$ is positive, the damping force of the passive damper counters the movement and the damping force pulls the vehicle bodywork downwardly; if the relative damper velocity $V_{DK}$ is negative, the damping force presses the vehicle bodywork upwardly. Accordingly, when the vertical velocity $V_A$ of the vehicle bodywork is negative, the vehicle bodywork moves downwardly and a maximum value of the damping is wanted in order to press the bodywork upwardly. Such an example is presented in the third section of FIG. 3 where the respective bars and the designations "high" and "low" show the degree of damping. If, in contrast, the vehicle bodywork moves upwardly, that is, $V_A$ is positive, then a maximum value of damping is sought when $V_{DK}$ is positive in order to suppress the upward movement of the bodywork; whereas, a minimum value of damping is sought for a positive $V_A$ when $V_{DK}$ is negative in order to no longer support the vehicle bodywork movement upwardly. The corresponding behavior applies for negative bodywork velocity. The described skyhook control simulates the ideal control configuration of a body displacement having a passive damper which is mounted between the vehicle bodywork and a fictitious counter support arranged outside of the vehicle.

In addition to the switchover between a high and a low damping as shown in FIG. 3, it is possible with a continuous control method to adjust intermediate values.

Figure 1:
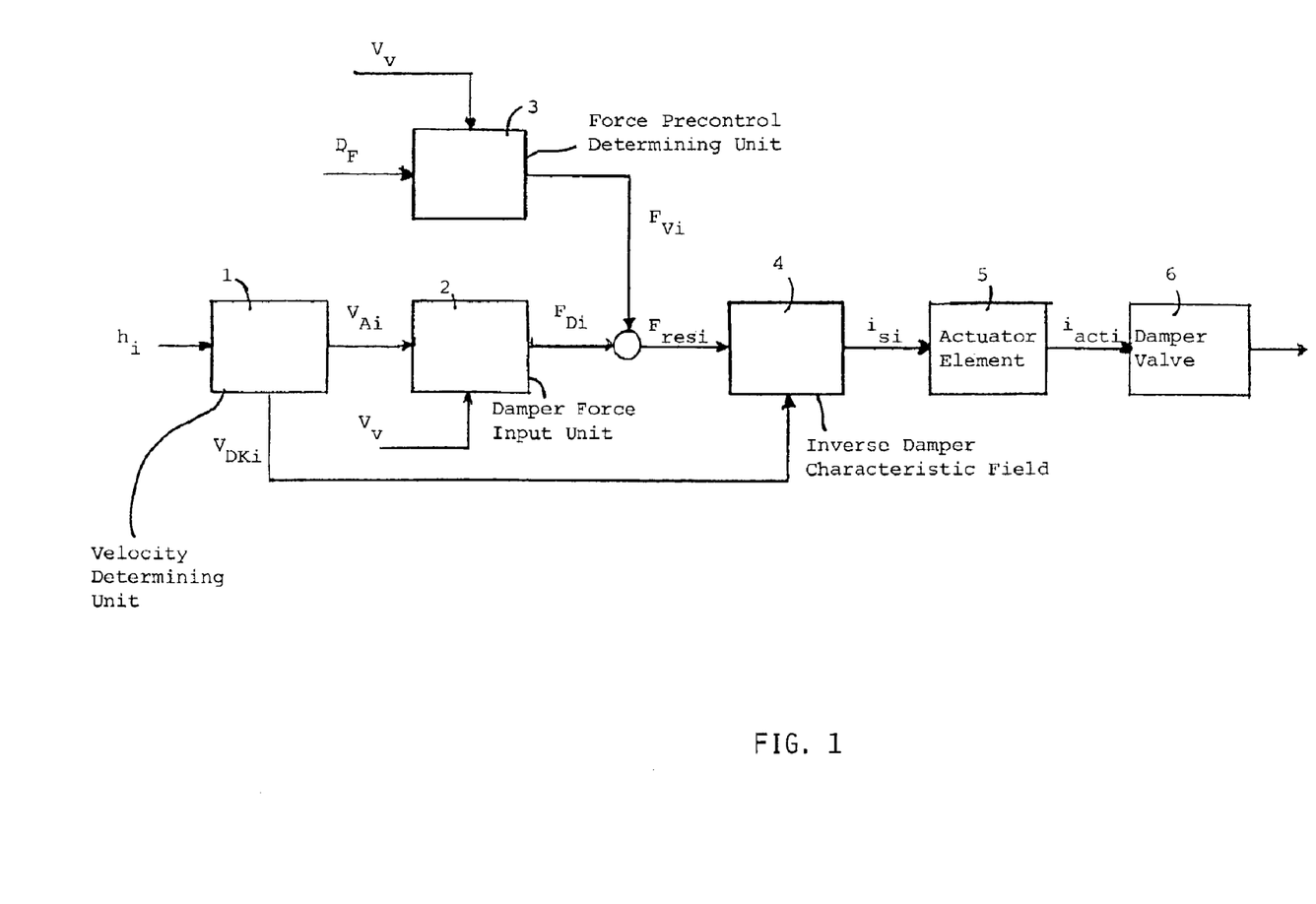
FIG. 1 is a block circuit diagram showing a control method of the invention for adjusting the damper force.

FIG. 1 is a block circuit diagram for the control of the position of a damper valve 6 via which the damping force can be changed. The distance signal $h_i$ serves as an input quantity wherein the index i identifies the particular component to be damped. In a motor vehicle, this is especially a wheel.

Reference numeral 1 identifies a velocity determining unit whose function is described in detail hereinafter with respect to FIG. 2. In velocity-determining unit 1, the bodywork velocity $V_{Ai}$ and the damping velocity $V_{DK}$ are determined. The bodywork velocity $V_{Ai}$ and a vehicle velocity $V_V$ are supplied to a damper force input unit 2 wherein the necessary damping force is determined based on the bodywork velocity $V_{Ai}$ in combination with the vehicle velocity $V_V$. The determined necessary damping force $F_{Di}$ is outputted as a result. In a force precontrol determining unit 3, the precontrol damping force $F_{Vi}$ is determined from the vehicle speed $V_V$ and dynamic factors $D_F$.

For example, the braking force, the steering angle or intended accelerations of the vehicle are represented in the dynamic factors $D_F$. These dynamic factors $D_F$ are, for example, directly taken off at the operator-controlled elements such as the steering wheel or pedals and, because of the inertia of the entire vehicle with respect to steering, braking or acceleration actions, corresponding displacements of the vehicle bodywork can be estimated in advance and a corresponding change of the damping force at the corresponding damper can be undertaken. As a result of the force precontrol, the precontrol damper force $F_{Vi}$ is outputted, which, together with the damping force $F_{Di}$, which is determined from the bodywork velocity $V_{Ai}$ and the vehicle speed $V_V$, yields the resulting requested damping force $F_{resi}$.

The resulting requested damping force Fresi and the damper velocity $V_{DKi}$ are supplied to an inverse damper characteristic field 4 wherein $F_{resi}$ and $V_{DKi}$ supply the input quantities for the determination of the corresponding characteristic variable for the desired actuating current $i_{si}$. The value of the desired actuating current $i_{si}$ can be read directly out of the characteristic field wherein, with reference to FIG. 4b, the corresponding value for the damper velocity $V_{DKi}$ must be inputted. The corresponding value must be read out at the crossing point with the corresponding value for the resulting requested damper force $F_{resi}$ which replaces the quantity $F_D$ in FIG. 4b.

Accordingly, the desired actuating current $i_{si}$ can be read directly out of the inverse damper characteristic field 4 and this desired actuating current is supplied to an actuator element 5 which, in turn, transmits the actually flowing current $i_{acti}$ to the damper valve 6. With the shift of the damper valve 6, a flow cross section is changed whereby the damper force is varied in correspondence to the request.

The variables of the bodywork velocity $V_{Ai}$ and the relative damper velocity $V_{DKi}$ are required for the computation of the first determined damping force $F_{Di}$. The variables of the bodywork velocity $V_{Ai}$ and relative damper velocity $V_{DKi}$ are computed from the distance signal $h_i$ in the velocity determining unit 1 whose function is explained in detail with respect to FIG. 2.

Figure 2:
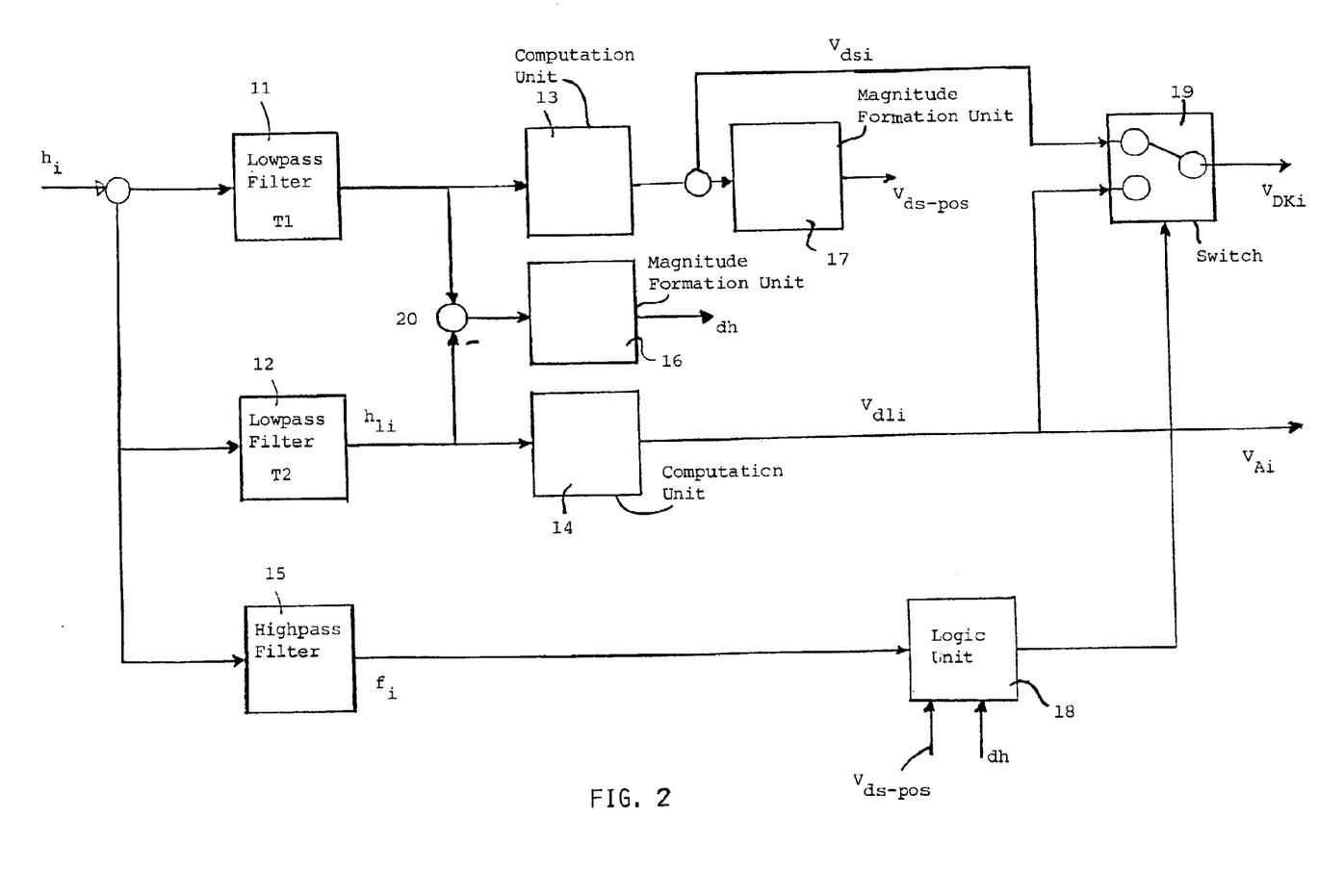
FIG. 2 is a block circuit diagram for determining a damper velocity signal from a distance signal.

Referring to FIG. 2, the distance signal $h_i$ is supplied to a first lowpass filter 11, a second lowpass filter 12 and a highpass filter 15. The first lowpass filter has a time constant $T_1$ for determining a first output signal $h_{si}$ which is conducted to a computation unit 13 for computing a first velocity signal $V_{dsi}$ and likewise to a coupling location. The second lowpass filter 12 has a time constant $T_2$ which is greater than the time constant $T_1$ of the first lowpass filter 11. The distance signal $h_i$ is likewise applied to the second lowpass filter 12 and the lowpass filter 12 filters out a second distance signal $h_{li}$, which, in turn, is supplied to a computation unit 14 for computing the second velocity signal $V_{dli}$ and, on the other hand, is supplied to the coupling unit 20 with a negative sign.

In the coupling unit 20, the first filtered distance signal $h_{si}$ and the second filtered distance signal $h_{li}$ having a negative sign are added and, in the magnitude formation unit 16, a difference signal dh is generated which is applied as a parameter for the evaluation of the damper velocity signals to be used. The manner in which this evaluation takes place is explained hereinafter.

The second damper velocity signal $V_{dli}$ is supplied to a switch 19 as well as to the damper force input unit 2 shown in FIG. 1. There, the first determined damper force $F_{Di}$ is computed in combination with the vehicle velocity $V_V$.

The first damper velocity signal $V_{dsi}$ is likewise supplied to the switch 19 and to a magnitude formation unit 17 to form the magnitude $V_{ds-pos}$.

Finally, the distance signal $h_i$ is supplied to a highpass filter 15 which selects the wheel vibrations which can no longer be effectively set by the actuating member. The highpass filter 15 outputs a signal $f_i$ which is transmitted to a logic unit 18.

The variables of the difference signal $d_h$ and the magnitude of the first damper velocity signal $V_{ds-pos}$, which are determined from the magnitude determination units 16 and 17, respectively, are likewise directed to this logic unit 18. Based on the inputted quantities, a decision is made in this logic unit 18 as to which signal should be transmitted to the switch 19. The decision as to which of the damper velocity signals is to form the basis of the further processing is made based on the evaluation of the inputted quantities. If the magnitude of the first velocity signal is greater than a first characteristic value or the difference signal is greater than a second characteristic value and the signal $f_i$ is less than a limit value, then the first damper velocity signal $V_{dsi}$ is set as the damper velocity $V_{DKi}$. If this logic condition is not satisfied, the value of the second damper velocity signal $V_{dli}$ is taken as a relative damper velocity $V_{DKi}$ and this second damper velocity signal is determined over a longer time constant. This relative damper velocity $V_{DKi}$ is then supplied to the inverse damper characteristic field 4 as an input quantity in accordance with FIG. 1.

Especially when applying the skyhook principle, it is necessary that the damper velocity in the wheel frequency range is determined with as little phase delay as possible. This is very well possible with the method described above because, with high damping velocities, a dynamically fast but, in return, not so accurate first damping velocity $V_{dsi}$ is taken and, otherwise, the more accurate, but, in return, dynamically slower second damping velocity $V_{dli}$ is utilized. By using the highpass filter 15, a high frequency excitation of the skyhook system and a correspondingly high frequency switching of the actuator are not present which leads to a reduction of the switching noise. Also, the actuator is not so highly mechanically burdened.

Figure 5:
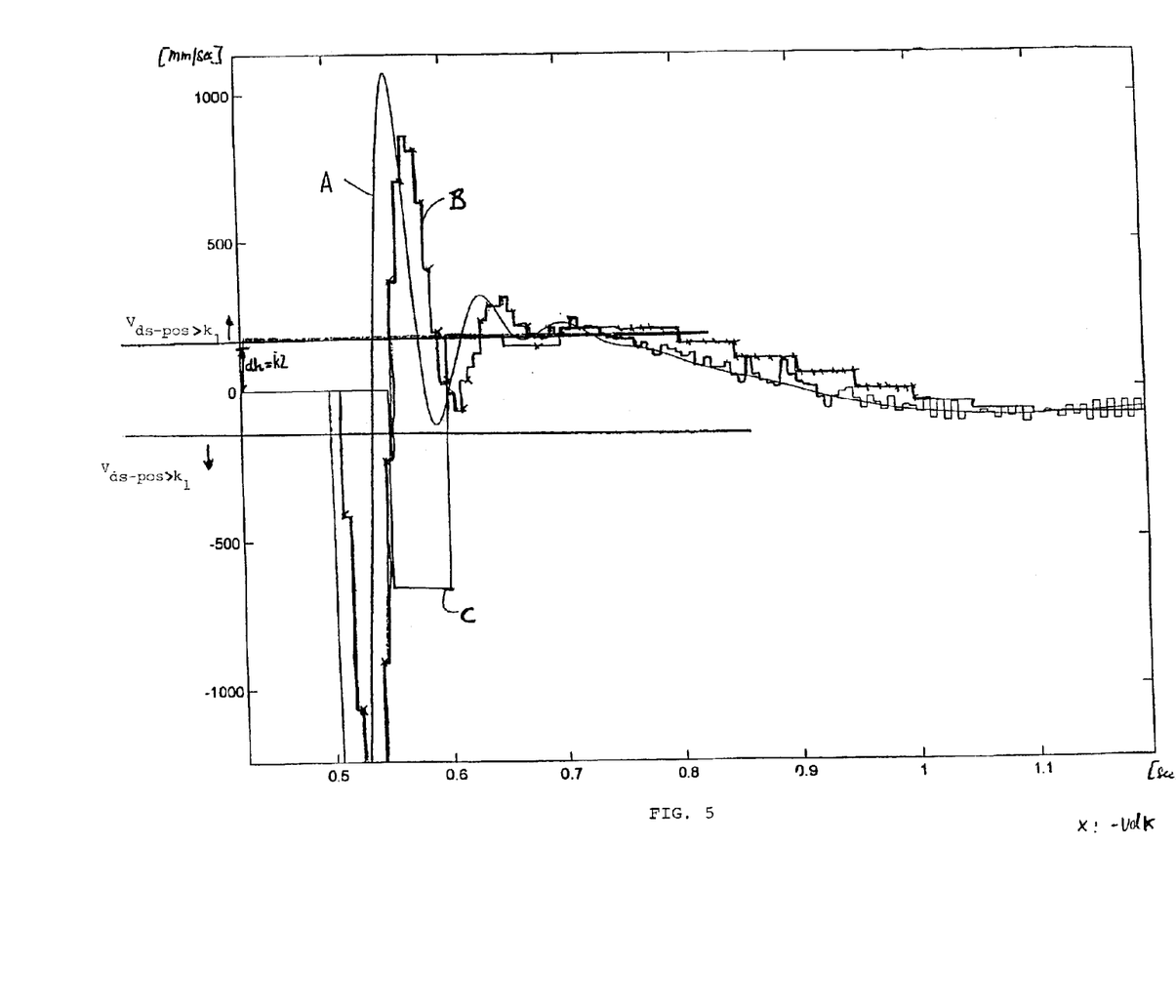
FIG. 5 is an example of the time-dependent trace of a control.

An example of the characteristic of a control in view of the damper velocity is shown in FIG. 5, in which the curve A represents the velocity signal in continuous measurement. The curve B is the digitalized velocity signal with a correspondingly short clock cycle, which allows a very fast reaction to the velocity changes. A further curve C is the digitalized form of the curve A over a longer time interval whereby the low fluctuations about a rest position are better compensated. Also shown in FIG. 5 are the limit values $V_{ds\text{-}pos}$ at a value of approximately 200 mm/sec as well as the difference signal $d_h$.

In the curve shown, the amount $V_{ds\text{-}pos}$ exceeds the limit value so that the first velocity signal $V_{dsi}$ is used for a further control of the damper force. After two zero passages of the curve A, the difference signal is smaller than the predetermined limit value so that switching takes place to the more precise but slower second damping velocity signal $V_{dli}$. In the further characteristic of the curve A, the slower velocity signal $V_{dli}$ is then also taken as a basis since the difference signal $d_h$ lies below the predetermined limit value.

In the further characteristic of the curve A it becomes clear that, because of the large time interval $T_2$, a frequent switching can be prevented between a hard and a soft damping or between different damping conditions, which would be the case if constantly only a short timing cycle $T_1$ with the corresponding velocity signal $V_{dsi}$ would be taken as a basis. Such a fast back and forth switching would always be necessary when exceeding or dropping below the curve B with respect to the curve A.

It is understood that the foregoing description is that of the preferred embodiments of the invention and that various changes and modifications may be made thereto without departing from the spirit and scope of the invention as defined in the appended claims.

What is claimed is:

1. A method for controlling (open loop or closed loop) the damping force of an adjustable damper in a motor vehicle having an active or semi-active damping system, the method comprising the steps of:
   measuring the distance between a wheel and the bodywork of said motor vehicle utilizing distance sensors for generating distance sensor signals ($h_i$);
   forming a difference of said distance sensor signals ($h_i$);
   determining damping velocity signals ($V_{dl}$, $V_{ds}$) from said difference of said distance sensor signals ($h_i$) over a fixed time difference;
   determining the damning velocity ($V_{DK}$) from said damping velocity signals ($V_{dl}$, $V_{ds}$); and,
   controlling (open loop or closed loop) said damping force in dependence upon the damping velocity ($V_{DK}$).

2. The method of claim 1, wherein the damping velocity signals ($V_{dl}$, $V_{ds}$) are determined individually for each component to be damped.

3. The method of claim 1, wherein a highpass filter is used to filter out oscillations of low frequency below 2 Hz from said distance signals ($h_i$).

4. The method of claim 3, wherein said damping velocity signal ($V_{dl}$) is applied for the computation of the inverse damper characteristic field when said output signal of said highpass filter exceeds a limit value.

5. A method for controlling (open loop or closed loop) the damning force of an adjustable damper in a motor vehicle having an active or semi-active damping system, the method comprising the steps of:
   determining damping velocity signals ($V_{dl}$, $V_{ds}$) utilizing distance sensors and a difference formation of the distance sensor signals ($h_i$) over a fixed time difference;
   controlling (open loop or closed loop) said damping force in dependence upon the damning velocity ($V_{DK}$); and,
   wherein a first one of said damping velocity signals ($V_{ds}$) is determined via the difference formation of said distance sensor signal ($h_i$) over a first time interval and a second one of said velocity signals ($V_{dl}$) via the difference formation of said distance signal ($h_i$) over a second time interval; and, said first time interval being less than said second time interval; and, a selection is made based on fixed parameters as to which one of said damping velocity signals ($V_{dl}$, $V_{ds}$) is to form the basis of the control of said damping force ($F_D$).

6. The method of claim 5, wherein said first damping velocity signal ($V_{ds}$) is formed over a time interval of 0.5 msec to 5 msec and said second damping velocity signal ($V_{dl}$) is formed over a time interval of 5 msec to 50 msec.

7. The method of claim 5, wherein a fixed threshold value of the magnitude of said first damping velocity signal ($V_{ds}$) is used as one of said parameters; said first damping velocity signal ($V_{ds}$) forms the basis of the control of said damping force ($F_D$) when said fixed threshold value is exceeded and said second damping velocity signal ($V_{dl}$) forms the basis of the control of said damping force ($F_D$) when said fixed threshold value is not exceeded.

8. The method of claim 5, wherein said distance sensor signal ($h_i$) is filtered with a first lowpass filter having a small time constant (T1) to determine a first output signal ($h_s$) and said distance sensor signal ($h_i$) is filtered with a second lowpass filter having a greater time constant (T2) to determine a second output signal ($h_l$); and, said output signals ($h_s$, $h_l$) are used to compute said damping velocity signals ($V_{ds}$, $V_{dl}$).

9. The method of claim 5, wherein said damping force ($F_D$) is controlled in accordance with one of the following: skyhook method, groundhook method or a combination of said skyhook and groundhook methods.

10. The method of claim 9, wherein said damping velocity ($V_{DX}$) is used to compute an inverse damping characteristic field and the bodywork velocity ($V_A$) is determined from an integration of a signal of an acceleration sensor mounted on the bodywork of said vehicle.

11. The method of claim 9, wherein said damping velocity ($V_{DK}$) is used for the determination of said inverse damping field and the bodywork velocity ($V_A$) is determined from a damping velocity signal ($V_{dl}$) having a filtered out wheel velocity component.

12. The method of claim 11, wherein said second one of said damping velocity signals ($V_{dl}$) is used as said damping velocity ($V_{DK}$).

13. A method for controlling (open loop or closed loop) the damping force of an adjustable damper in a motor vehicle having an active or semi-active damping system, the method comprising the steps of:
   determining damping velocity signals ($V_{dl}$, $V_{ds}$) over a fixed time difference utilizing distance sensors and a difference formation of the distance sensor signals ($h_i$);
   controlling (open loop or closed loop) said damping force in dependence upon the damping velocity ($V_{DK}$);
   wherein said distance sensor signal ($h_i$) is filtered with a first lowpass filter having a small time constant (T1) to determine a first output signal ($h_s$) and is filtered with a second lowpass filter having a greater time constant (T2) to determine a second output signal ($h_l$); the magnitude of a difference signal ($d_h$) between said first and second output signals ($h_s$, $h_l$) is used as a parameter; and, a selection is made based on a fixed threshold value of said difference signal ($d_h$) as to which of said damping velocity signals ($V_{ds}$, $V_{dl}$) forms the basis of said control of said damping force.

14. The method of claim 13, wherein said first damping velocity signal ($V_{ds}$) forms the basis of the control of said damping force ($F_D$) when a threshold value for the magnitude of said difference signal ($d_h$) is exceeded; and, said second damping velocity signal ($V_{dl}$) is used to control said damping force ($F_D$) when said threshold value is not exceeded.

15. The method of claim 14, wherein said smaller time constant (T1) is 0.25 msec to 2.5 msec and said greater time constant (T2) is 2.5 msec to 25 msec.

16. The method of claim 14, wherein said first damping velocity signal ($V_{ds}$) forms the basis of the control of said damping force ($F_D$) when the threshold for the magnitude of said difference signal ($d_h$) and the threshold value of the magnitude of said first damping velocity signal ($V_{ds}$) are exceeded; and, said second damping velocity signal ($V_{dl}$) forms the basis of said control of said damping force ($F_D$) when said threshold for the magnitude of said difference signal ($d_h$) and the threshold value of the magnitude of said first damping velocity signal ($V_{ds}$) are not exceeded.

* * * * *

UNITED STATES PATENT AND TRADEMARK OFFICE
CERTIFICATE OF CORRECTION

PATENT NO. : 6,847,874 B2
DATED : January 25, 2005
INVENTOR(S) : Alexander Stiller It is certified that error appears in the above-identified patent and that said Letters Patent is hereby corrected as shown below:

Column 5,
Line 37, delete "Fresi" and substitute -- $F_{resi}$ -- therefor.

Column 7,
Lines 60 and 67, delete "damning" and substitute -- damping -- therefor.

Column 8,
Line 34, delete "($V_{DX}$)" and substitute -- ($V_{DK}$) -- therefor.

Signed and Sealed this

Tenth Day of May, 2005

JON W. DUDAS
*Director of the United States Patent and Trademark Office*